United States Patent [19]

Reinholdsson

[11] Patent Number: 5,211,319
[45] Date of Patent: May 18, 1993

[54] METHOD OF PREVENTING SEPARATION IN BULK MATERIALS

[75] Inventor: Bo Reinholdsson, Örsundsbro, Sweden

[73] Assignee: Uni Patent AB, Örsundsbro, Sweden

[21] Appl. No.: 649,713

[22] Filed: Feb. 1, 1991

[30] Foreign Application Priority Data

Jun. 2, 1989 [SE] Sweden ............................. 8902022
Mar. 2, 1990 [SE] Sweden ............................. 9000757

[51] Int. Cl.⁵ ............................................. E01C 19/08
[52] U.S. Cl. ................................ 222/547; 222/564; 414/288; 414/328
[58] Field of Search ............... 414/293, 299, 303, 328, 414/329, 267, 288; 222/564, 547; 239/687

[56] References Cited

U.S. PATENT DOCUMENTS

| | | | |
|---|---|---|---|
| 1,201,409 | 10/1916 | Whitsett | 222/564 X |
| 1,570,172 | 1/1926 | O'Neil | 414/267 |
| 2,486,200 | 10/1949 | O'Connor | 222/564 |
| 2,611,685 | 9/1952 | Yoder | 414/293 X |
| 2,646,407 | 7/1953 | Lassiat et al. | 414/299 X |
| 2,805,802 | 9/1957 | Strong | 222/564 |
| 3,374,908 | 3/1968 | Giesking | 414/329 |
| 3,441,225 | 4/1969 | Cotter et al. | 239/687 X |
| 3,666,119 | 5/1972 | Parsons | 414/328 |
| 3,802,582 | 4/1974 | Brock | 414/293 |
| 3,945,511 | 3/1976 | Delorme | 414/293 |
| 4,061,246 | 12/1977 | Miksitz | 222/546 X |
| 4,158,537 | 6/1979 | Cuff et al. | 222/564 X |
| 4,721,425 | 1/1988 | Strocker | 414/299 X |

FOREIGN PATENT DOCUMENTS

2136407 9/1984 United Kingdom ................ 222/564

Primary Examiner—David A. Bucci
Attorney, Agent, or Firm—Young & Thompson

[57] ABSTRACT

Summarily, the present invention relates to equipment preventing separation in bulk material in connection with transfer and/or transport of such material. The equipment includes at least one compartment or tube (11) which is open straight through and through which the material is caused to flow when it is loaded onto a substructure. Suitably, the material is delimited to what can be likened to pillars, by its being caused to flow through an array of compartments or tubes (14) arranged mutually adjacent.

17 Claims, 6 Drawing Sheets

METHOD OF PREVENTING SEPARATION IN BULK MATERIALS

This is a continuation in part application of International Application No. PCT/SE90/00359 filed on May 28, 1990.

BACKGROUND OF THE INVENTION

The present invention basically relates to methods and equipment for preventing separation in bulk materials, which contains material of different particle sizes.

The invention has come into being for solving the problem with the separation occurring in ballast material included in the asphalt composition ordinarily used for metalling roads, streets and the like. It is, however, not limited to this particular application but can be utilized in many different fields, e.g. with concrete, manuring agents and the like, in which particles or ingredients are included that have varying sizes.

Very often, the metalling on streets and roads has an uneven quality due to the ballast material in the asphalt composition having separated during the different steps in transport, when the composition is transferred first from the asphalt works to an intermediate storage sealer and then from this to the transport vehicle and from there to the layer and at last out on the roadway. In each step, each material size in the ballast material strives to collect at the sloping surfaces automatically formed when the asphalt composition is tipped.

The uneven structure of the laid asphalt composition results in the risk of traffic accidents increasing since certain areas get poor water runoff, the risk of water planing then increasing, and wear will be uneven so that the roadway can be wavy and repair patching must take place.

For several reasons, it would therefore be a saving if the quality on the laid asphalt composition could be made better than what the case is today. The roadway could be made more safe for traffic with less risk of different types of skidding accidents as well as other types of accident, and maintenance could be reduced by avoiding patching and repairing individual places. Instead, larger road sections could be renovated at greater intervals than what is the case today, which is something which could save costs in the order of millions every year in roadway maintenance.

SUMMARY OF THE INVENTION

The present invention has the object of obviating the above-mentioned problems by simple means and equipment and without interfering in the asphalt composition itself or its production. This object is achieved by the method and equipment of the kind disclosed in the accompanying claims, from which also will be seen the characterizing features of the invention.

BRIEF DESCRIPTION OF THE DRAWINGS

The invention will now be described in more detail in the following and in connection with the accompany drawings, where

FIGS. 22I-IV schematically illustrate in sections different operational steps for the intermediate storage silo illustrated in FIGS. 18-19;

DESCRIPTION OF THE PREFERRED EMBODIMENT

Figure 1:
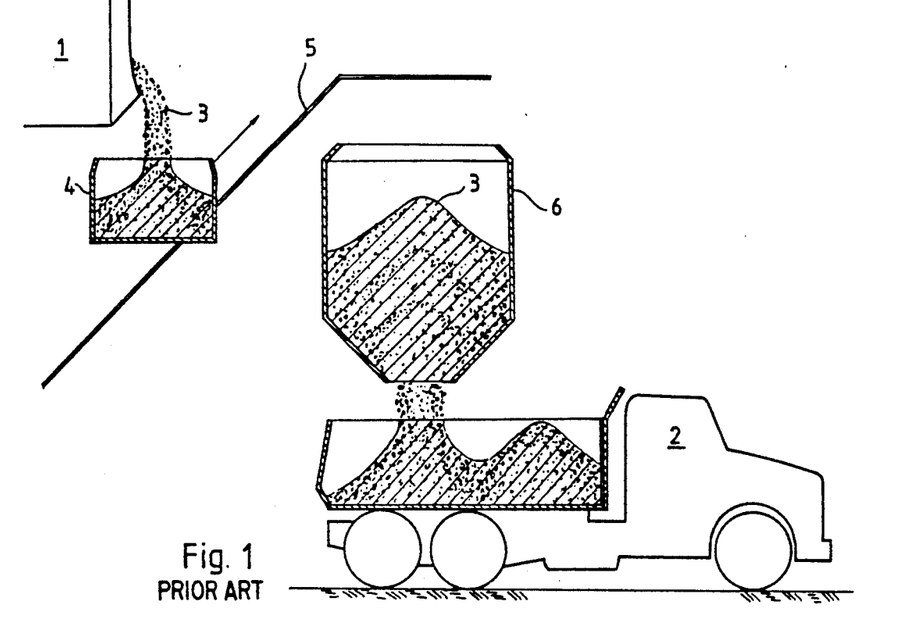
FIG. 1 is a schematic depiction of conventional conveyance of asphalt composition between an asphalt mixer and a transport vehicle.

According to FIG. 1, illustrating the conventional procedure in moving the asphalt composition from an asphalt mixer to a truck 2, the asphalt composition 3 is first tipped from the mixer 1 to the skip 4 running on a sloping track 5. The skip lifts the composition 3 for tipping it into a hot holding hopper 6 for intermediate storage of the composition 3 and from which the material is tapped onto transport vehicles such as trucks 2. In each tipping or tapping operation, the asphalt composition 3 behaves as gravel, i.e. it forms a pyramid-like pile where the larger stones roll out towards the sides of the pile and the material will be finer and finer the further inwards and upwards it is in the pile. If two piles are tipped onto the deck of a truck, as is often the case, there will be an extra large collection of larger stones where the two piles come against each other. Later on, when the deck is tipped, the asphalt composition in the separated state is transferred to the asphalt spreader, which in turn spreads the separated asphalt composition in the undesired way mentioned in the introduction. It should also be noticed that the greater the height at which tapping or tappings takes/take place, the greater will be separation.

Figure 2:
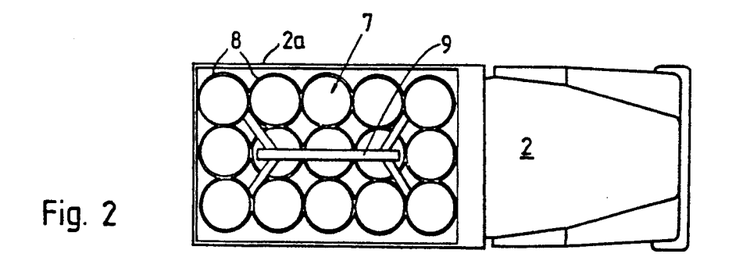
FIG. 2 is a schematic view seen from above of a transport vehicle provided with an embodiment of equipment in accordance with the invention.
Figure 3:
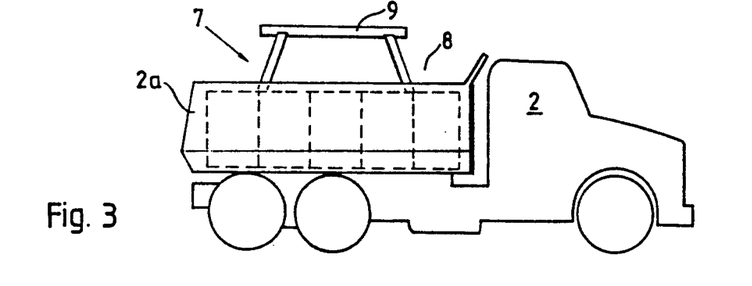
FIG. 3 is a schematic side view of the vehicle in FIG. 2.

When the asphalt composition 3 leaves the mixer 1, it is substantially homogenous. If it is to be tapped directly onto a truck deck, which may be the case, an auxiliary divider 7 is placed on the truck. This divider comprises in the illustrated embodiment of an array of metal tubes 8, all of which have the same height which is suitable somewhat lower than the height of the side walls surrounding the truck 4a. The tubes are mutually attached so that they form a honeycomb-like unit of a size accommodated on the deck 2a and which substantially covers the whole of the deck. A lifting yoke 9 is attached to the container 7 such as to project up above the upper edge of the side walls a sufficient extent for a lifting means easily to be hooked onto it for lifting on and off the divider 7. This auxiliary divider is suitably put into place on the deck 2a before loading and is removed as soon as loading is completed.

This divider has the result that each metal tube 8 is individually filled as well as the spaces between the tubes and there can thus occur a minor separation in each of them. When the divider is removed, the asphalt composition flows together and the composition will be homogenous. When the asphalt composition is then transferred from the deck 2a to an asphalt spreader, a last positive mixing occurs by the vertically loaded columns which have been formed in the tube sections gradually falling from the top part and downwards into a cohesive mass from the deck and down into the laying trough.

Figure 4:
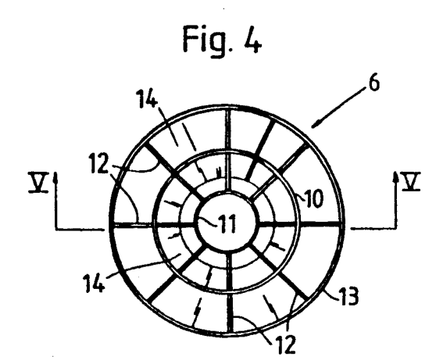
FIG. 4 is a schematic view of a hot holding hopper seen from above and provided with an embodiment of equipment in accordance with the invention.
Figure 5:
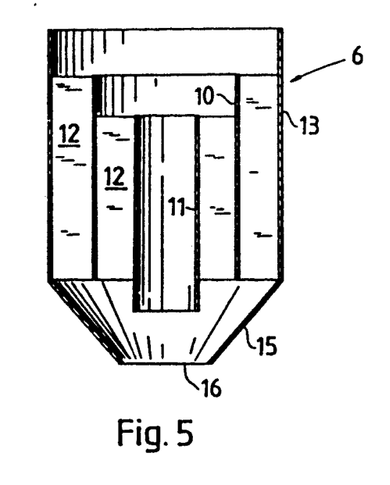
FIG. 5 is a section taken along the line V—V in FIG. 4.

If the whole procedure according to FIG. 1 is utilized, at least the hot holding hopper 6 and preferably also the skip 4 each has an embodiment respectively according to FIGS. 4 and 5. The means required for keeping the asphalt composition in the hopper 6 hot during the intermediate storage time are not shown. The hopper 6, which is suitably, as shown, a circular upstanding container is provided with a set of mutually concentric tubes 10 and 11 kept in place by baffles 12 extending from the outer walls 13 of the hopper 6 radially inwards to the innermost tube 11, thus dividing the hopper into a plurality of compartments 14.

Figures 6, 8:
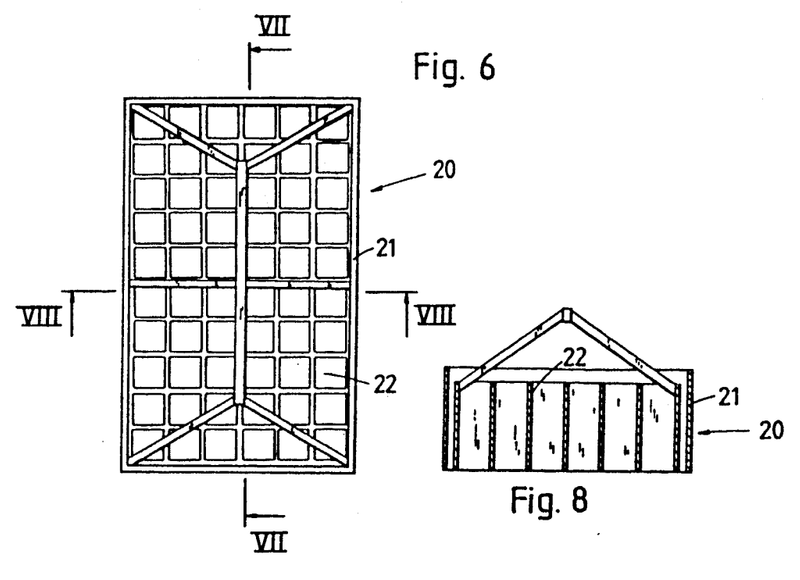
FIG. 6 is a schematic view from above of a second embodiment of equipment in accordance with the invention intended to be placed on a vehicle deck.
FIG. 8 is a section taken along the line VIII—VIII in FIG. 6.
Figure 7:
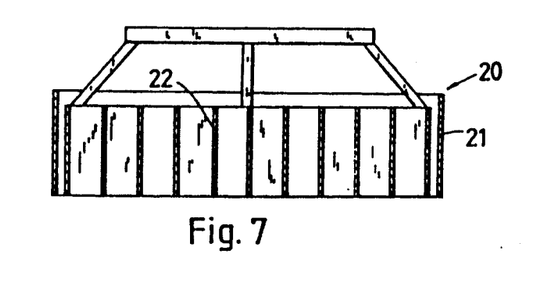
FIG. 7 is a section along the line VII—VII in FIG. 6.

The hopper 6 is conically formed 15 at its lower tapping end, this cone being preferably somewhat more acute than the angle of repose of the asphalt composition. The concentric tubes 10-11 terminate a distance above the cone 15 which means that when tapping takes place by opening the hatch 16 at the bottom of the cone, the asphalt composition flows out substantially to the same extent from all the compartments 14. The result of this is that the small amount of separation occurring in the respective compartment disappears in the homogenizing taking place when the composition runs down along the cone 15. In the embodiments of the invention described so far, structures including circular tubes have been used. In FIGS. 6-8, there is shown an alternative embodiment of the divider 7 according to FIGS. 2 and 3. The divider 20 according to FIGS. 6-8 comprises a rectangular frame 21 with a shape corresponding substantially to the shape of the vehicle deck on which it is to be used. Inside the frame 21, the frame is divided into substantially square tubes 22 over which the composition is to be tipped.

Figures 9, 11:
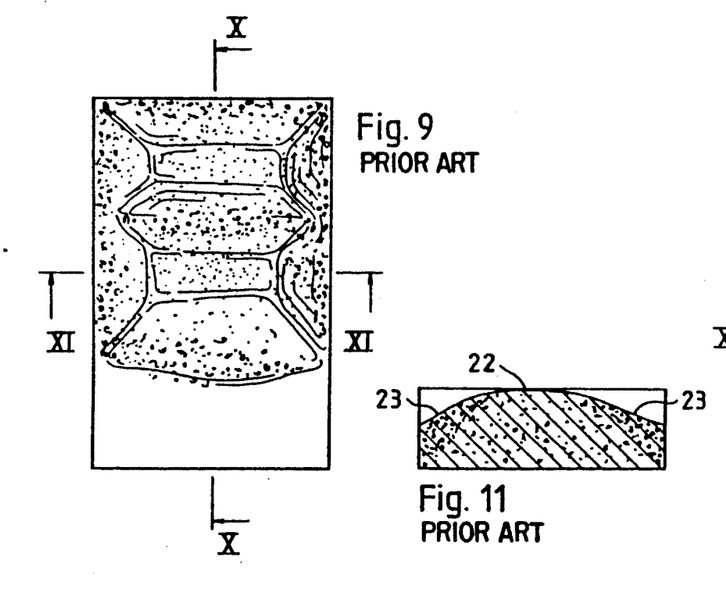
FIG. 9 is a schematic view from above of a vehicle deck loaded partially conventionally where loading of asphalt composition has taken place in two steps.
FIG. 11 is a section taken along the line XI—XI in FIG. 9.
Figure 10:
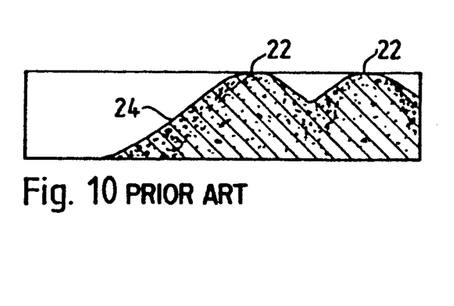
FIG. 10 is a section taken along the line X—X in FIG. 9.

It will be seen from FIGS. 9-11 how the composition tipped onto a deck is distributed when tipping takes place in two steps from an intermediate store of conventional embodiment. Accordingly, this means that a predetermined amount of the composition is first tapped onto the deck, after which the vehicle is moved forward a step and a second tapping takes place. This can be repeated until the whole deck has been filled.

As previously mentioned, the problem with tipping bulk material is that the coarser particles or the coarser part of the ballast strives to come out as far as possible from the actual point of tipping and thus rolls out where there are slopes. It will be seen from FIG. 11 that the bulk material is distributed in cross-section so that it forms a hump 22, the coarser particles rolling and coming against the side wall of the deck at 23. Some separation thus takes place here.

Where the bulk material slopes, there is formed an incline 24 and when the vehicle travels, the heavier particles are shaken out and down along this incline for finally collecting together on the deck itself. In tipping from the deck, these coarser or heavier particles will fall off first and be collected in a single place in the asphalt spreader. The latter will then lay an area which is very richly provided with heavier ballast material.

Figures 12, 14:
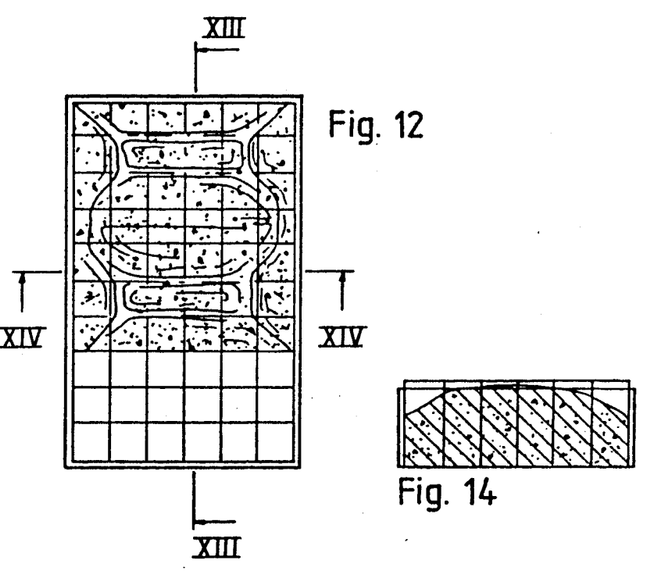
FIG. 12 is a schematic view from above of a partially loaded vehicle deck corresponding to FIG. 9, loading having taken place with equipment according to FIGS. 6-8 mounted on the deck.
FIG. 14 is a section taken along the line XIV—XIV in FIG. 12.
Figure 13:
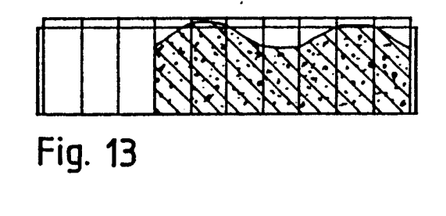
FIG. 13 is a section taken along the line XIII—XIII in FIG. 12.

If this is then compared with what is apparent from FIGS. 12-14, where a divider according to FIGS. 6-8 has been put to use, it will be seen that the slopes mentioned have become substantially less and the walls in the divider prevent heavier and coarser material from pushing out to the slopes. The risk of separation has thus been reduced to an essential degree in this way.

Figures 15, 17:
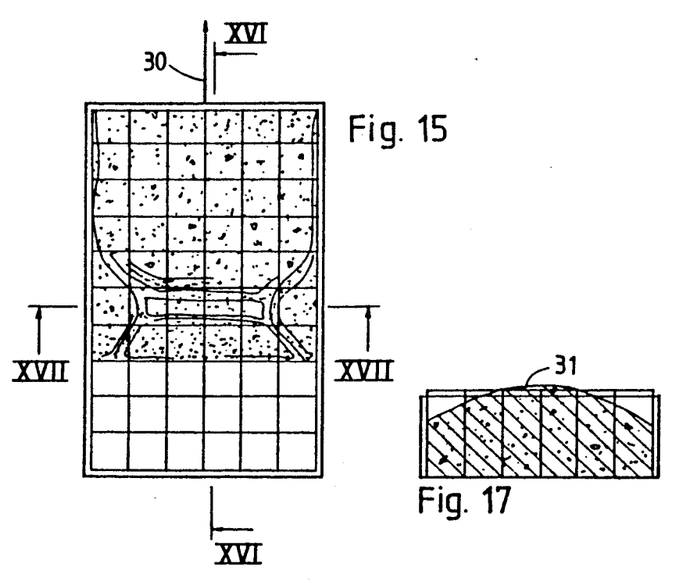
FIG. 15 is a schematic view from above of a vehicle deck loaded partially conventionally and corresponding to FIG. 9, loading having taken place with equipment according to FIGS. 6-8 mounted on the deck and carried out during continuous forward travel of the vehicle.
FIG. 17 is a section taken along the line XVII—XVII in FIG. 15.
Figure 16:
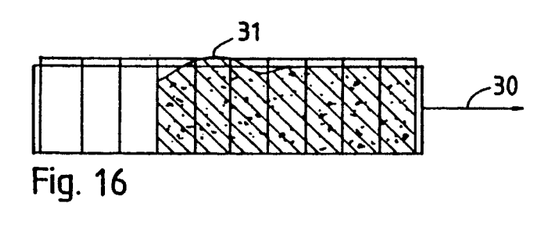
FIG. 16 is a section taken along the line XVI—XVI in FIG. 15.

In FIGS. 15-17, there is shown what takes place when tipping bulk goods takes place on the vehicle deck while it is advancing the whole time in the direction of the arrows 30. A divider 20 according to FIGS. 6-8 prevents separation and the formation of slopes. It will be seen particularly from FIG. 16 how no notable slopes are formed. The shape according to FIG. 17 is then changed during the advance of the vehicle so that the small hump 31 which projects up over the divider 20 is shaken out and the load becomes quite flat. If not, this hump 30 disappears when the divider is lifted away before the vehicle leaves the loading area.

Figure 18:
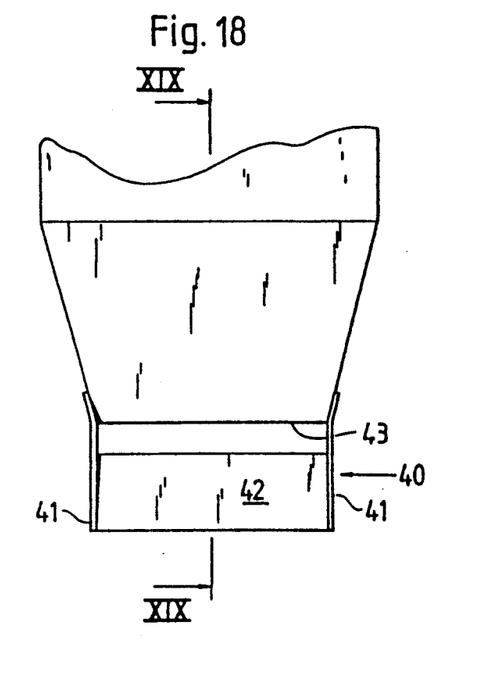
FIG. 18 is a schematic, fragmental side view of an intermediate storage silo provided with a spreader in accordance with the invention.
Figure 19:
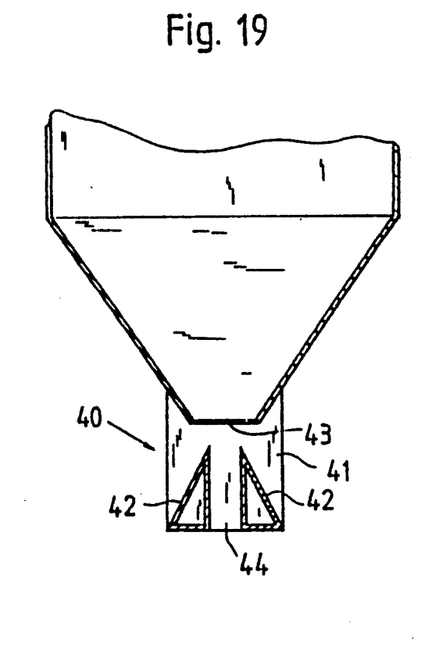
FIG. 19 is a section taken along the line XIX—XIX in FIG. 18.

Irrespective of what type of intermediate storage and/or hot holding hopper is used when a vehicle is to be loaded, a spreader 40 according to FIGS. 18 and 19 at the discharge opening 43 gives a uniform discharge of the bulk material with reduced separation. The spreader 40 comprises two end members 41, located one at either end thereof, and two beams 42 which are triangular in cross-section and have their apexes facing upwards towards the hopper. In the illustrated embodiment, the triangles are right-angular with their hypotenuses facing away each other and the beams defining a gap 44 through which a part of the bulk material flowing down from the hopper can pass. However, the gap 44 is too narrow for all the material which could arrive there, and a part of the material will pass on the outside of the beams 42. This does not depend entirely on what has been said above but also on the upwardly directed apexes of the beams 42 lying within the edges of the discharge opening 43.

In the use of this spreader 40, the bulk material will thus be divided into three streams, which then blend together to form a pile or for being spread out over a divider 20 of the kind already mentioned. There then occurs renewed blending resulting in that possible separation in the streams is avoided.

Figure 20:
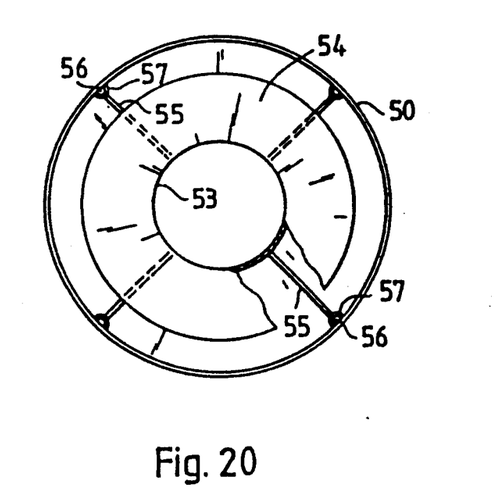
FIG. 20 is a schematic view from above of the intermediate silo illustrated in FIG. 16, and which is provided with an hoistable insert.
Figure 21:
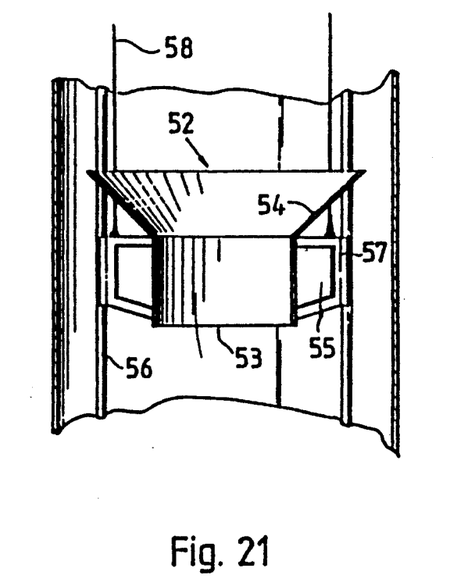
FIG. 21 is a section taken along the line E—E in FIG. 18.
Figure 22:
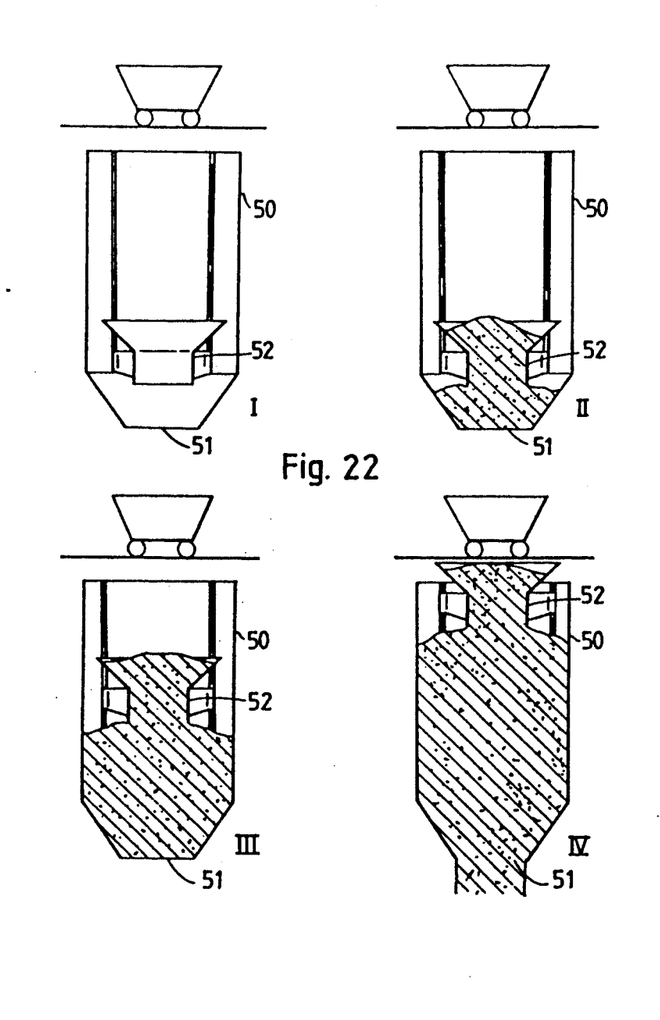

In FIGS. 20-22, there is illustrated a further embodiment of the separation inhibiting device for bulk goods, this device being intended for placing in an intermediate and/or hot holding hopper. In the embodiment illustrated, the hopper 50 itself comprises a cylindrical drum, at its lower end provided with a closeable discharge opening 51, all of which is conventional. The discharge opening 51 may be provided with a spreader 40 of the kind to be seen from FIGS. 18 and 19.

In the illustrated embodiment, a cylindrical funnel 52 is hoistably arranged inside the drum 50. The funnel comprises a lower pipe portion 53 which is cylindrical and has a diameter less than half the diameter of the drum 50, and an upper conical portion 54 with an outwardly increasing diameter, its upper diameter being approximately ⅝ of the diameter of the drum 50. From the tube portion 53, there are four blades or baffles 55 projecting radially outwards at 90° spacing. At the outer ends of these, there are guides 56 in the form of vertical rails attached to the inside of the drum 50 and these coact with guide means 57 at the outer ends of the blades 55 so that the funnel 52 can be moved upwards and downwards in the drum 50 without altering position except in height.

The movement upwards and downwards of the funnel 52 in the drum takes place with the aid of cables 58 in the illustrated embodiment, upwardly in the drum 59 these cables being taken over unillustrated sheaves to unillustrated hoisting machinery. Lowering of the funnel 52 suitably takes place with the aid of gravity. The position in height of the funnel is regulated with the aid of a sensing device to suit the amount of bulk material in the silos.

Hydraulic or pneumatic motor power can be used instead of the cables 58 which are then replaced with piston and cylinder arrangements.

According to FIG. 22I, the funnel 52 is at its lowest position in the drum 50. This is the position for initially filling the drum from the skip indicated above it. Material from the skip is collected by the funnel 52 and the latter is raised in time with the supply of material. This means that the funnel is filled all the time, which is apparent from FIGS. 22II and 22III and it meets the material falling down from the skip so that the material never forms a pile and thus no coarser ballast material rolls down at the sides to lie in a ring. The drum has the same distribution of the bulk material at this end until the situation where it is filled, as is apparent from FIG. 22IV. When tapping from the discharge opening 51, the funnel 52 accompanies the material downwards in the drum 50 and prevents separation in it. If the discharge opening 51 is then provided with a spreader 40 according to FIGS. 18-19, the material is spread uniformly over the deck or the like, without risk of separation.

Figure 23:
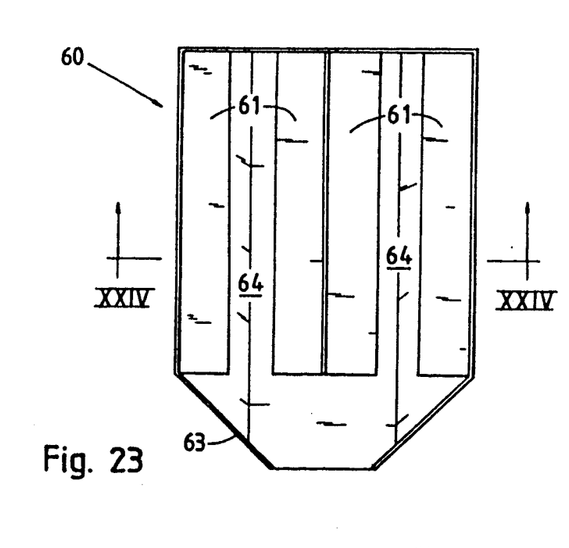
FIG. 23 is a schematic view from above of a concrete container on a transport vehicle provided with equipment in accordance with the invention.
Figure 24:
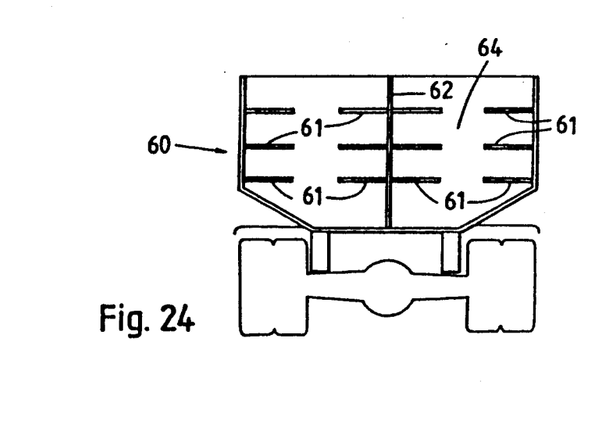
FIG. 24 is a section taken along the line XXIV—XXIV in FIG. 23.

Finally, in FIGS. 23 and 24, there is illustrated a further variant of the invention, intended for use with containers on trucks, usually for carrying concrete mixes, but other material such as asphalt composition can also constitute the load. The schematically illustrated container 60, which is intended for tipping backwards for emptying, is provided with an array of internal shelves 61 which are attached to the outer walls and also to a longitudinal central wall 62. Both the central wall 62 and shelves 61 terminate a distance from the rear end wall 63 of the container 60.

The container 60 is completely open upwards and the material which is to be transported in it is filled from above. There is a gap 64 between the opposing shelves 61 between outer wall and central wall, this gap having a width sufficient for all sizes of the ballast material in the concrete, asphalt or the like to pass through without any problems. By the turbulence in the material when it is tapped into the container 60 and inertia, the ballast accompanies the rest of the material in over the shelves 61, and when the ballast begins to sink, which is affected by the container 60 shaking when the truck is driven, a very large part of the material sinks down to rest on both shelves and the bottom of the container. The rear end wall 63 of the container 60 has a spout-like shape so that when tipping the container, the material in it flows out in what can be regarded as a jet. During tipping, which takes place backwards, as mentioned, the ballast runs off backwards from the shelves 61 and a renewed blending of ballast and material takes place against the rear end wall 63 as well as while merging into the mentioned jet.

Although several apparently different embodiments of the invention have been shown and described, one skilled in the art will understand that there is the same basic concept behind all of them, which is that the invention is directed towards preventing the bulk materials from forming relatively large sharply tipped piles where the ballast readily rolls out to lie in a ring at the bottom of the pile or collect in some other way separate from the rest of the bulk material.

It will thus be understood that the present invention has solved in a simple, cheap and effective manner the well-known problem with separation of ballast material and other coarser material from the rest of the material. In other words, the object stated in the introduction has been achieved. Many further variations of the invention will be obvious to one skilled in the art, against the background of this description. Such variations are, however, within the scope of the invention as defined in the following claims.

I claim:

1. An apparatus for dispensing solid bulk material which comprises solid ingredients of varying sizes, the apparatus including a drum having a first end having an opening into which said solid bulk material may be dispensed into said drum and an opposite second end having an opening which can be opened and closed and from which said solid bulk material may be discharged from said drum when said opposite second end is opened, wherein the improvement comprises means positioned within said drum and dividing said drum into a plurality of compartments each having a constant cross-section for (a) segregating into said plurality of compartments said solid bulk material, which is dispensed into said drum at said first end, in the absence of any substantial separation of said solid bulk materials according to size and (b) dispensing said solid bulk material towards said opposite second end such that any separation of said solid ingredients according to size which might occur in any compartment of said plurality of compartments will be substantially eliminated when said solid bulk material is discharged at said opposite second end.

2. The apparatus of claim 1 wherein said segregating and dispensing means includes at least one tubular member having one open end directed towards said first end of said drum and another open end opposite said one open end and directed towards said second end of said drum.

3. The apparatus of claim 2 wherein said drum and said at least one tubular member are of a circular cross-section.

4. The apparatus of claim 2 further including means for moving said at least one tubular member towards and away from said first end and said second end of said drum.

5. The apparatus of claim 2 wherein said tubular member is funnel-shaped.

6. The apparatus of claim 4 wherein said tubular member is funnel-shaped.

7. The apparatus of claim 2 further including means at said second end of said drum for spreading said solid bulk material, said spreading means being positioned below said opening of said opposite second end.

8. The apparatus of claim 4 further including means at said second end of said drum for spreading said solid bulk material, said spreading means being positioned below said opening of said opposite second end.

9. The apparatus of claim 7 wherein said tubular member is funnel-shaped.

10. The apparatus of claim 8 wherein said tubular member is funnel-shaped.

11. The apparatus of claim 7 wherein said spreader means comprises a first beam attached to said drum at said opposite second end and a second beam attached to said drum at said opposite second end, said first beam and said second beam being substantially parallel relative to each other and being of triangular cross section.

12. Equipment for preventing separation in bulk material comprising:

a drum having an internal wall and a first end having an opening into which said bulk material may be dispensed into said drum and an opposite second end having an opening which can be opened and closed and from which said solid bulk material may be discharged from said drum;

a least one tubular member disposed within and coupled to said drum, said at least one tubular member being spaced from said internal wall and having one open end directed towards said first end of said drum and another open end opposite said one end and directed towards said opposite second end of said drum; and a spreader attached to said drum at said opposite second end, said spreader being spaced from said opening of said opposite second end in a direction away from said first end and comprising a first beam and a second beam which are substantially parallel relative to each other and which are of triangular cross section.

13. The equipment of claim 12 wherein said drum and said at least one tubular member are of circular cross-section.

14. The equipment of claim 12 further including means for moving said at least one tubular member towards and away from said first end and said opposite second end of said drum.

15. The equipment of claim 14 wherein said at least one tubular member is in the form of a funnel.

16. The equipment of claim 13 further including means for moving said at least one tubular member towards and away from said first end and said opposite second end of said drum.

17. The equipment of claim 16 wherein said at least one tubular member is in the form of a funnel.

* * * * *